US011345183B2

(12) United States Patent
Celio et al.

(10) Patent No.: US 11,345,183 B2
(45) Date of Patent: May 31, 2022

(54) DECORATIVE TRANSFER METHODS AND APPARATUS

(71) Applicant: IRON ORCHID DESIGNS, LLC, Lincoln, CA (US)

(72) Inventors: Josie G. Celio, Garden Valley, CA (US); Sally O. Griswold, Lincoln, CA (US)

(73) Assignee: IRON ORCHID DESIGNS, LLC, Lincoln, CA (US)

( * ) Notice: Subject to any disclaimer, the term of this patent is extended or adjusted under 35 U.S.C. 154(b) by 0 days.

(21) Appl. No.: 17/392,095

(22) Filed: Aug. 2, 2021

(65) Prior Publication Data

US 2022/0009274 A1 Jan. 13, 2022

Related U.S. Application Data

(63) Continuation-in-part of application No. 17/232,684, filed on Apr. 16, 2021, now Pat. No. 11,124,014, which is a continuation of application No. 17/109,850, filed on Dec. 2, 2020.

(60) Provisional application No. 63/216,632, filed on Jun. 30, 2021, provisional application No. 63/180,796, filed on Apr. 28, 2021, provisional application No. 62/943,040, filed on Dec. 3, 2019.

(51) Int. Cl.
*B44C 1/16* (2006.01)
*B44C 1/17* (2006.01)
*C09D 7/40* (2018.01)

(52) U.S. Cl.
CPC ............ *B44C 1/162* (2013.01); *B44C 1/1737* (2013.01); *C09D 7/70* (2018.01)

(58) Field of Classification Search
CPC .......... B44C 1/162; B44C 1/1737; C09D 7/70
USPC ............................................... 428/221, 195.1
See application file for complete search history.

(56) References Cited

U.S. PATENT DOCUMENTS

| | | | |
|---|---|---|---|
| 3,761,344 A | 9/1973 | Mrozek | |
| 3,945,141 A | 3/1976 | Frost | |
| 4,103,053 A * | 7/1978 | Barehas | B44C 1/1733 156/219 |
| 4,339,886 A | 7/1982 | Griffiths | |
| 4,480,260 A * | 10/1984 | Yamato | B41M 5/155 503/209 |
| 4,880,678 A * | 11/1989 | Goffi | B44C 1/1716 428/32.81 |
| 4,900,392 A | 2/1990 | Bradshaw | |
| 4,986,573 A | 1/1991 | Brunhoefer | |
| 5,673,490 A | 10/1997 | Hill | |
| 6,688,364 B2 | 2/2004 | Simpson | |

(Continued)

FOREIGN PATENT DOCUMENTS

| | | |
|---|---|---|
| CA | 2158258 A1 | 10/1994 |
| DE | 6750410 U | 1/1969 |

(Continued)

OTHER PUBLICATIONS

English translation of FR2596676.

(Continued)

*Primary Examiner* — Tri V Nguyen
(74) *Attorney, Agent, or Firm* — O'Banion & Ritchey LLP; John P. O'Banion

(57) ABSTRACT

Apparatus and methods for transferring a pigment-based decorative design onto a surface without using a plastic film or adhesive.

12 Claims, 5 Drawing Sheets

(56) References Cited

U.S. PATENT DOCUMENTS

| | | | |
|---|---|---|---|
| 11,124,014 B2 | 9/2021 | Celio | |
| 2003/0098906 A1* | 5/2003 | Randen | B44C 1/1741 |
| | | | 347/103 |
| 2015/0352822 A1* | 12/2015 | Niebling | B44C 1/1712 |
| | | | 156/237 |

FOREIGN PATENT DOCUMENTS

| | | |
|---|---|---|
| DE | 2331807 C3 | 5/1982 |
| DE | 3429501 A1 | 4/1986 |
| FR | 2579524 B1 | 5/1987 |
| FR | 2596676 B1 | 7/1991 |

OTHER PUBLICATIONS

English translation of DE2331807.
United States Patent and Trademark Office (USPTO), non-final office action dated Jun. 11, 2021, U.S. Appl. No. 17/232,684, pp. 1-9, claims examined, pp. 10-12.
English translation of CA2158258A1.
English translation of DE3429501A1.
English translation of DE6750410U.
United States Patent and Trademark Office (USPTO), final office action dated Jul. 27, 2021, related U.S. Appl. No. 17/232,684, pp. 1-65, claims examined, pp. 66-70.
United States Patent and Trademark Office (USPTO), Notice of Allowability, related U.S. Appl. No. 17/232,684, pp. 1-8, claims allowed, pp. 9-12.
Sanbao, "Vine Rose, Ceramic Underglace decal", downloaded from the Internet on Sep. 1, 2021, https://www.chinaclayart.com/collections/underglaze-decal/products/full-color-vine-rose, 4 pages.

* cited by examiner

DECORATIVE TRANSFER METHODS AND APPARATUS

CROSS-REFERENCE TO RELATED APPLICATIONS

This application claims priority to, and the benefit of, U.S. provisional patent application Ser. No. 63/216,632 filed on Jun. 30, 2021, incorporated herein by reference in its entirety. This application claims priority to, and the benefit of, U.S. provisional patent application Ser. No. 63/180,796 filed on Apr. 28, 2021, incorporated herein by reference in its entirety. This application is a continuation-in-part of U.S. patent application Ser. No. 17/232,684 filed on Apr. 16, 2021, incorporated herein by reference in its entirety, which is a continuation of U.S. patent application Ser. No. 17/109,850 filed on Dec. 2, 2020, incorporated herein by reference in its entirety, which application claims priority to, and the benefit of, U.S. provisional patent application Ser. No. 62/943,040 filed on Dec. 3, 2019, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to transferring artwork to an object.

2. Background Discussion

Decorative transfers are popular for enhancing the appearance of an object, such as surfaces of furniture, walls, cabinets, windows and other object. Typically decorative transfers are printed onto one side of a carrier sheet. To apply the decorative transfer to an object, the side of the carrier sheet with the decorative transfer is placed against the surface of the object and pressure is applied to the opposite side of the carrier sheet by, for example, a rubbing motion.

BRIEF SUMMARY

Described herein are apparatus and methods for transferring a pigment-based decorative design onto a surface without using a plastic film or adhesive.

In one embodiment, the apparatus comprises a carrier sheet and a decorative design on one side of the carrier sheet. The decorative design is formed from a pigment-based material such as paint that is applied to the carrier sheet and allowed to cure (e.g., dry). The pigment-based material comprises a formulation that can be reactivated after it is cured. By way of example, a suitable paint formulation comprises a mixture of pigment, whiting, water, and gum arabic. Generally, non-polymer formulations are preferred but polymer-based paint formulations (e.g., acrylic or latex paints) could be used as well.

In one embodiment, the carrier sheet comprises a translucent paper-like material that allows the decorative design to be seen through the paper during placement. The carrier sheet preferably is absorbent and sufficiently strong to withstand tension while wet, such as from brushing the surface.

In one embodiment, to apply the decorative design to an intended surface, the end user applies a transfer medium such as a coat of paint to the intended transfer surface. While the coat of paint is still wet, the side of the carrier sheet with the decorative design (pigment side) is placed against the intended transfer surface such that the decorative design contacts the coat of paint.

Notably, the paint forming the decorative design is reactivated by contact with the coat of paint. Reactivation by the coat of paint is a key feature of the transfer method and apparatus.

The carrier sheet is then smoothed with a brayer, firm sponge, or the like while applying gentle pressure, and left in place while the decorative design and coat of paint are allowed to set up or dry to the touch. Note that the decorative design and coat of paint could be allowed to completely dry, but need only be sufficiently dry that carrier sheet can be removed without lifting the decorative design off of the coat of paint. Thereafter, the carrier sheet can be spritzed with water and slowly peeled off of the surface. In this way, the decorative design is transferred to the coat of paint on the intended transfer surface.

Because the decorative design will still be reactive to water, preferably the surface is sprayed with a fixative, after which a sealer can be brushed or sprayed onto the surface if desired.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

This disclosure describes methods and apparatus for transferring a decorative design from a carrier sheet to an intended surface. As used herein, the terms "intended surface" or "intended transfer surface" mean a surface to which the decorative design ultimately will be transferred. Since the "decorative design" ultimately will be transferred to an intended surface, the decorative design may be referred to herein as a "decorative transfer". Additionally, the combination of the carrier sheet and the decorative transfer may be referred to herein as a "transfer" or "decorative transfer apparatus". Furthermore, when a decorative transfer is said to be "on" or "carried on" a side of the carrier sheet the term "on" is intended to encompass any conventional attachment or placement technique on the carrier sheet.

Figure 1:
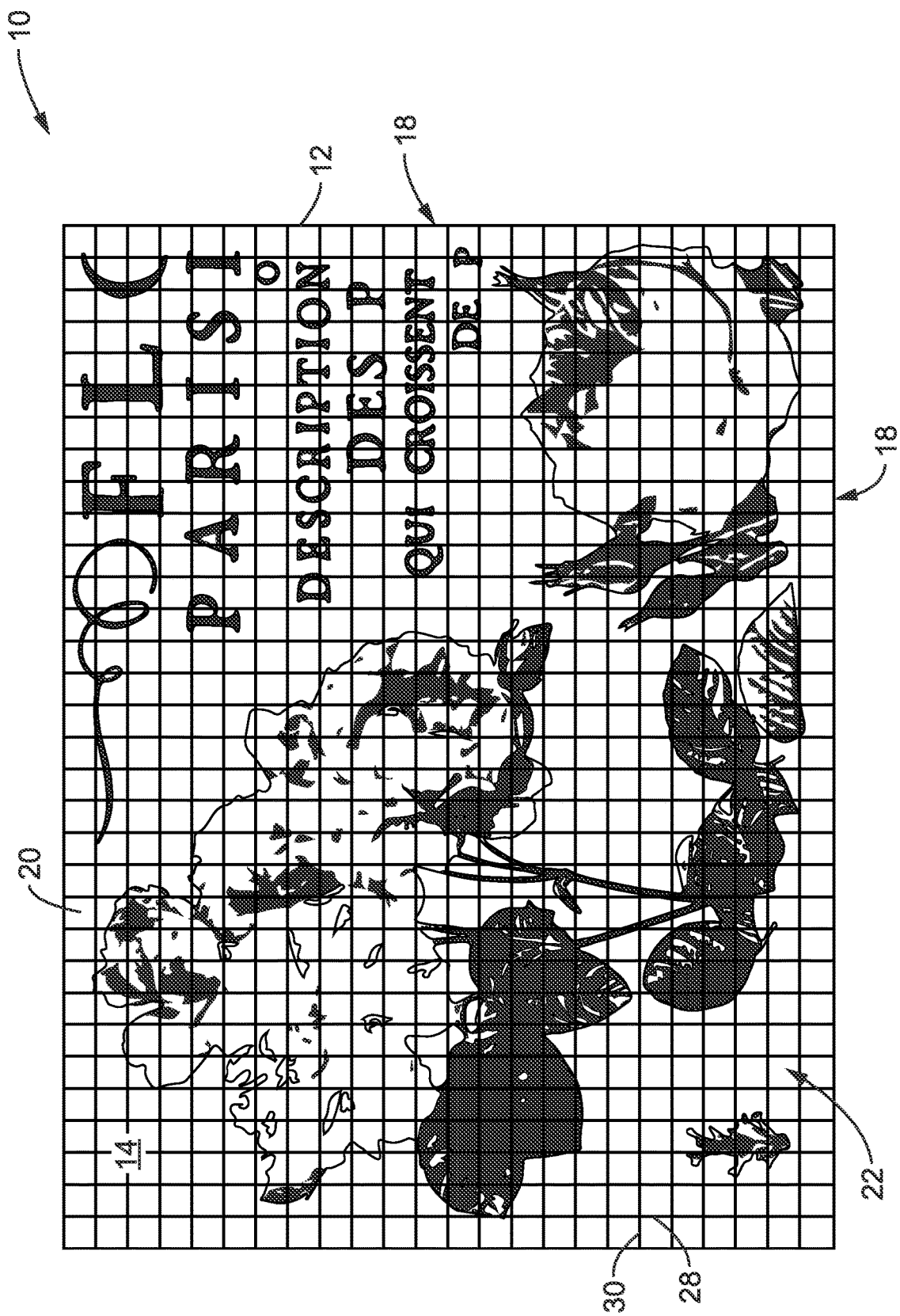
FIG. 1 shows a side of an embodiment of a decorative transfer apparatus according to the present disclosure.
Figure 2:
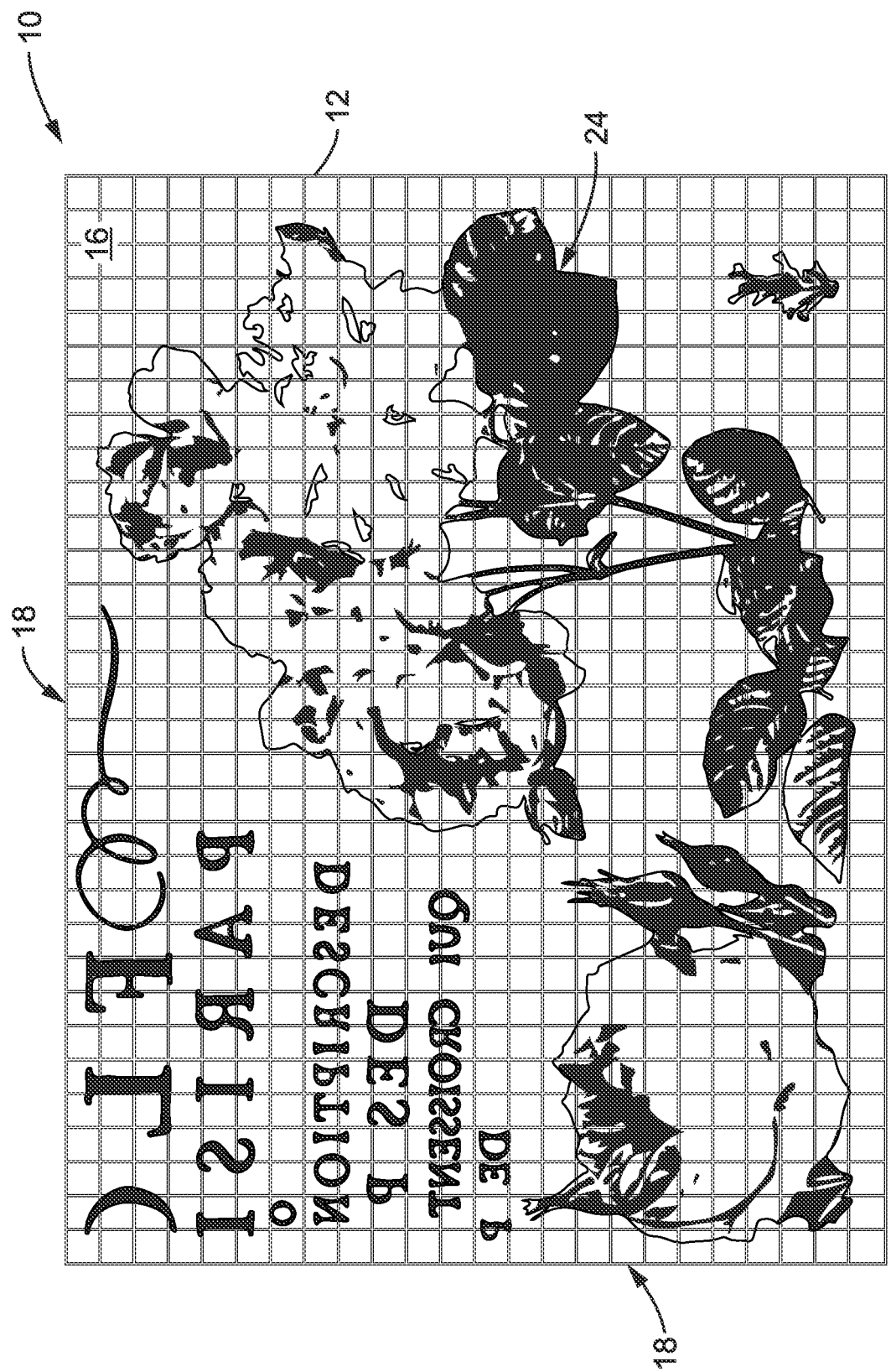
FIG. 2 shows the reverse side of the apparatus of FIG. 1.

Referring now to FIG. 1 and FIG. 2, in one embodiment a decorative transfer apparatus 10 comprises a carrier sheet 12 with a first side 14 and a second side 16, and a plurality of edges 18. While a rectangular shaped carrier sheet is shown, the shape can be square, circular, triangular, or other shapes without departing from the technology described herein.

Optionally, the first side 14 of the carrier sheet 12 has a plurality of squares, rectangles or the like 20 that are arranged to form a grid pattern 22. The grid pattern 22 is preferably printed on the first side 14 of the carrier sheet 12 but can be applied using other conventional techniques known to those skilled in the art. The grid pattern could also be cut or etched into the first side 14 of the carrier sheet 12 and the resultant grooves filled with ink, paint or other visible material. The grid pattern could also be embedded in the carrier sheet 12. Accordingly, as used in this disclosure, when a grid pattern is said to be "on" a side of the carrier sheet the term "on" is intended to encompass any of the foregoing grid pattern implementations.

A decorative transfer 24 is carried on the second side 16 of the carrier sheet 12. The particular content of the decorative transfer 24 is essentially unlimited. By way of example, and not of limitation, the decorative transfer 24 can be one or more decorative designs, images, numbers, or text, or combinations thereof. Preferably the decorative transfer 24 is formed from a pigment-based material applied to the second side 16 of the carrier sheet 12. The pigment-based material can be applied to the carrier sheet 12 in various ways which include, but are not limited to, digital printing, screen printing, hand painting, and process printing.

The pigment-based material forming the decorative transfer comprises a formulation that can be "reactivated" after it is cured (e.g., after it is dried to a non-tacky state on the carrier sheet). An example of a suitable formulation comprises a mixture of pigment, whiting, water and gum arabic. Generally, non-polymer formulations are preferred but polymer-based formulations such as acrylic or latex paints, could be used as well. The most suitable formulations would contain little, if any, polymers.

Reactivation of the material forming the decorative transfer occurs when the decorative transfer is placed against a transfer medium such as an uncured coat of paint on the intended transfer surface as described below.

Preferably the carrier sheet comprises a type of paper that is formulated (1) to be absorbent, (2) to be capable of releasing the cured pigment-based material when applied to the intended transfer surface (e.g., pressed against a bed of damp or wet paint), (3) to be strong even while wet, (4) to be translucent enough to see the decorative transfer through the opposite side during placement, (5) to minimize the typical wrinkling that is inherent when paper is wet, and (6) to conform well to irregular surfaces.

In one embodiment, the carrier sheet comprises rice paper. In one embodiment, the carrier sheet comprises a fibrous material such as Japanese Washi. In another embodiment, the carrier sheet comprises a material with a formulation comprising:

(a) kraft bleached softwood pulp—about 28%
(b) bitter bamboo—about 10%
(c) green sandalwood bark—about 15%
(d) straw grass with alkalinity—about 5%
(e) rice starch solution;
(f) cotton fiber; and
(g) polyamideamine-epichlorohydrin (PAE)—about 0.1%.

In one embodiment, the carrier sheet is coated with a final spray of a starch like substance to enhance the release of the pigment from the paper.

Other paper-like materials could be used as well.

In one embodiment, the decorative transfer is applied to a surface by performing a process comprising the following steps:

First, the intended transfer surface is prepared by applying a transfer medium such as a coat of paint. The paint formula can vary but preferably the paint should not contain a high level of polymers (and preferably little, if any polymers), and should be a basic formula which will not grip the carrier sheet so as prevent easy release after it has dried. An example of a suitable paint would be a mineral-based paint. Acrylic and latex paints are not desirable because they contain polymers. While paints that are not high in polymers are preferred for most applications, this is not a restriction and polymer-based paints could be used as well. Also, while the preferred approach is to coat the intended transfer surface with paint, it is also possible to coat the transfer with the paint and lay the transfer on an unpainted intended transfer surface.

While the coat of paint is still damp-wet, the side of the carrier sheet with the decorative transfer is placed carefully over the coat of damp or wet paint. At this stage, the pigment-based material forming the decorative transfer is in contact with the coat of paint on the intended transfer surface.

Notably, the pigment-based material forming the decorative transfer is reactivated by contact with the coat of paint on the intended transfer surface. Optionally, however, a light mist of water can be sprayed to the back side of the carrier sheet to dampen the pigment-based material forming the decorative transfer and compensate for any areas of the coat of paint that are not as wet as needed for reactivation.

Next, gentle and even pressure is applied to the back of the carrier sheet to help transfer the decorative design to the damp/wet paint on the intended transfer surface. To assist with applying pressure to the carrier sheet, various tools can be used such, for example, a brayer, a fat brush with a flat bristle surface, a firm smooth sponge, or any other tool that lends itself to applying gentle and even pressure. It will be appreciated that the goal is to establish good contact between the pigment-based material on the carrier sheet and the damp/wet coat of paint on the intended transfer surface.

Preferably, pressure is applied to the carrier sheet in up and down strokes, and lateral movement or dragging of the carrier sheet should be avoided. Dragging the carrier sheet can cause blurring of the decorative design and should be avoided.

It will appreciated that applying pressure results in the decorative transfer becoming embedded into the coat of wet paint/medium on the intended transfer surface. According, the decorative transfer can be considered an inlay. This does not mean, however, that the decorative transfer must be embedded or embedded to any particular depth.

Once the decorative transfer is applied, the decorative transfer and coat of paint are allowed to set or dry. Note that the decorative transfer and coat of paint could be allowed to completely dry, but need only be sufficiently dry that carrier sheet can be removed without lifting the decorative transfer off of the coat of paint. The amount of drying time will affect how completely the decorative design transfers, and time may, for example, be between about 10 minutes and about 1 hour longer depending on ambient temperature, humidity, thickness of base coat on the intended transfer surface, and the degree to which the carrier sheet was wetted.

Once the drying process is complete and the decorative design has been transferred, the carrier sheet is carefully peeled away. Preferably this is accomplished in steps comprising the following: first by gently spraying a light mist of water on the back surface of the carrier sheet and waiting about 30 seconds for the water to penetrate the carrier sheet, and second by gently lifting the damp carrier sheet off of the surface, starting at one end, and peeling up to reveal the transferred decorative design.

Finally, the transferred decorative design and coat of paint on the intended transfer surface are allowed to dry thoroughly. Because the pigment-based material forming the decorative transfer remains "active" until it has dried, it is possible to manipulate the design and apply special techniques before drying. This also means that many times a beautifully faded, second impression can be made with the residual pigment on a "leftover" transfer sheet. Depending on the techniques and colors used, it may be possible to obtain even a third impression. Note also that, even after drying, the decorative transfer may still be reactive to water. Therefore, it still might be possible to manipulate the decorative transfer if needed by wetting the decorative transfer.

After the decorative transfer is "finalized" (e.g., manipulated, touched up or left as it is), and the surface has completely dried, a sealer is preferably sprayed onto the surface. Using a brush to apply sealer at this stage is not recommended because doing so likely will blur or smear the decorative design. After the initial sealer is sprayed on, subsequent sealer coats can be brushed on. Sprayable art fixatives can be used, or diluted finish/topcoats can be used as sprayable setting agents, for example.

Example

1. Plan the layout of your designs for your surface
2. Using the grids on the backside of the transfer sheet, trim as needed and set aside.
3. Work in small sections, to manage the paint drying window as you work, e.g., generally not larger than about 12"×16".
4. On an appropriately prepared surface, apply an even and generous coat of mineral based chalk type paint. Not excessively thick, but just thick enough to leave some open time to place your transfer sheet while wet. For best results with basic application, do not use paints that are latex or polymer heavy. Polymer based topcoats can also be used, but the timing is different, so check out our tutorials for that and more special technique videos.
5. While paint is still wet, lay the transfer sheet, design side down (grids are printed on the back for easy identification of front and back), into the wet paint, keeping it taught. Spritz with an even, light mist of water. Using a smooth damp sponge or folded soft (without texture), pat down with even light pressure to make sure the design makes good content with the painted surface. Avoid excessive moving or dragging the paint inlay sheet once it is laid down, which can cause blur or smear.
6. Allow your surface with the transfer sheet to dry, at least to touch. If you are using chalk type paint, that can vary anywhere from 10 minutes to an hour, depending on conditions.
7. When ready to remove the transfer sheet from your surface, spritz lightly and evenly with water, and allow the paper to soften. This helps it release easier. Gently the paper up starting at one corner, and keep it at a low angle.
8. Repeat this process to complete your design, lining up your sections as appropriate.
9. If desired, you can use water to blend out, soften, add additional colors, etc., because the pigment is still movable and active.
10. Once you are happy with the decorative design it is time to seal it. There are a couple of options:
10.1 Apply a water based polyurethane type sealer directly over your work, being careful not to overwork. You will get some pigment migration and blur, but unless you overwork and depending on the coating, it should be minimal. Sometimes this can add to the overall look of a vintage piece.
10.2 Set your work with a spray on sealer or artist's fixative. Allow to dry. Apply your finish of choice.
10.3 You can also use wax to seal your piece. Apply according to manufacturer's directions and buff to a sheen as usual.
11. Don't worry if you have sections that do not transfer, that is how these are supposed to work. You can add a little paint to that area, and reapply if you choose, OR just go with the inherently varied and distressed beauty of it. In fact, one of our favorite optional techniques is to apply to crosshatched, uneven paint, to allow for uneven transfer of design, and maximize the secondary impression (it will have more pigment to transfer to the second use).
12. When design sections do not align perfectly, many times this is not noticeable because of the distressed nature of these finishes. However, any bits that you are not happy with can easily be touched up, or even blended while still active (before sealing), using a small brush to move the pigment around.
13. Decorative designs can be layered. This is a technique that can be done using a clear water based topcoat as the embedding medium.
14. Second (and even third) impressions are possible. After your first use, allow the transfer sheets to lay flat on their back and dry thoroughly, then place them back in their pad for safe keeping until you are ready to use them again.
15. Distressing with sandpaper—this can be done either before or after sealing. If you sand before sealing, you will have some pigment migration which can affect the color of the background. This can be desired, or not and the visibility of the pigment will depend on the contrast between the inlay colors and the background color of the surface. If you do not want any pigment migration, then we recommend distressing after you have sealed your piece and allowed it to dry thoroughly. Wipe down any resulting dust and seal with an additional coat.
16. While the basic instructions above are for painted wood, you can use the transfer sheets on a variety of surfaces.
16.1 Virtually any surface on which you can use chalk type paint is suitable for use with the transfer sheets.
16.2 The transfer sheets can be used on fabric with a quality fabric medium, and yes, you can get more than one impression even with fabric!

16.3 The transfer sheets can be used on glass, using a clear medium that adheres to glass.

It will be appreciated that the intended transfer surface could be any surface, such as a wall, furniture surface, glass surface, etc. It will also be appreciated that the transfer medium applied to the intended transfer surface for receiving and activating the decorative transfer could be could be paint, plaster and other materials.

Figure 3:
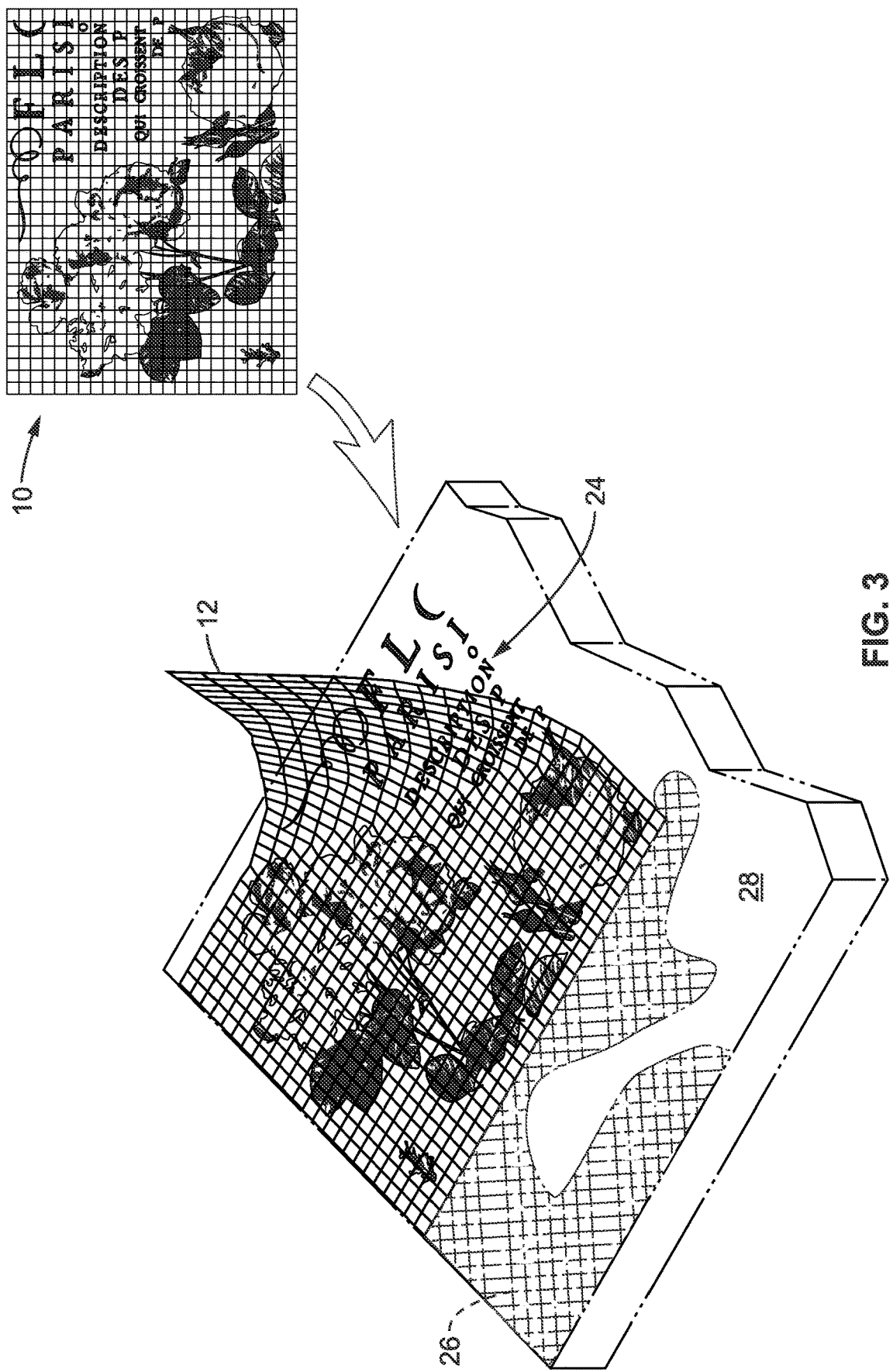
FIG. 3 illustrates applying a decorative transfer to an object according to an embodiment of the present disclosure.

Referring to FIG. 1 through FIG. 3, in one embodiment the grid pattern 22 and the decorative transfer 24 preferably are on opposite sides of the carrier sheet 12 but both the grid pattern 22 and the decorative transfer 24 could be on the same side of the carrier sheet 12.

It will also be appreciated that placement and application of the decorative transfer 24 on the intended transfer surface can be facilitated by being able to view the decorative transfer through the carrier sheet 12 as illustrated in FIG. 1. Accordingly, in one embodiment the carrier sheet 12 is transparent. The carrier sheet could also be translucent provided that the decorative transfer 24 is not obscured and can be seen clearly when viewed through the carrier sheet. FIG. 1 illustrates how the decorative transfer would be viewed through the first side 14 of the carrier sheet 12.

As illustrated in FIG. 3, after the decorative transfer 24 is applied to the coat of paint 26 on the intended transfer surface 28, the carrier sheet 12 is peeled, pulled away, or otherwise removed and discarded.

It will be appreciated that the gridded carrier sheet makes it easy to manipulate and apply the decorative transfer to the surface of an object. In one embodiment, prior to applying the decorative transfer 24 the user views the decorative transfer 24 through the gridded first side 14 of the carrier sheet 12. When viewed from this position, the grid pattern 22 overlays the decorative transfer 24. The user can elect to apply the decorative transfer 24 in its original form or, for example, using the grid pattern 22 as a guide, by first cutting an area adjacent the decorative transfer 24 or cutting the decorative transfer 24 itself. The user can also use the grid pattern 22 as a guide for positioning the transfer onto the surface. This can be done, for example, by using the grid pattern 22 to visually position the transfer. The user can also use the lines 30, 32 in the grid pattern 22 to trim the decorative transfer with straight lines in order to line it up properly with straight edges. The user can further use the lines 30, 32 in the grid pattern 22 to level the decorative transfer 24 by aligning the lines perpendicular or parallel to the lines of the object to which the decorative transfer is being applied.

Figure 4:
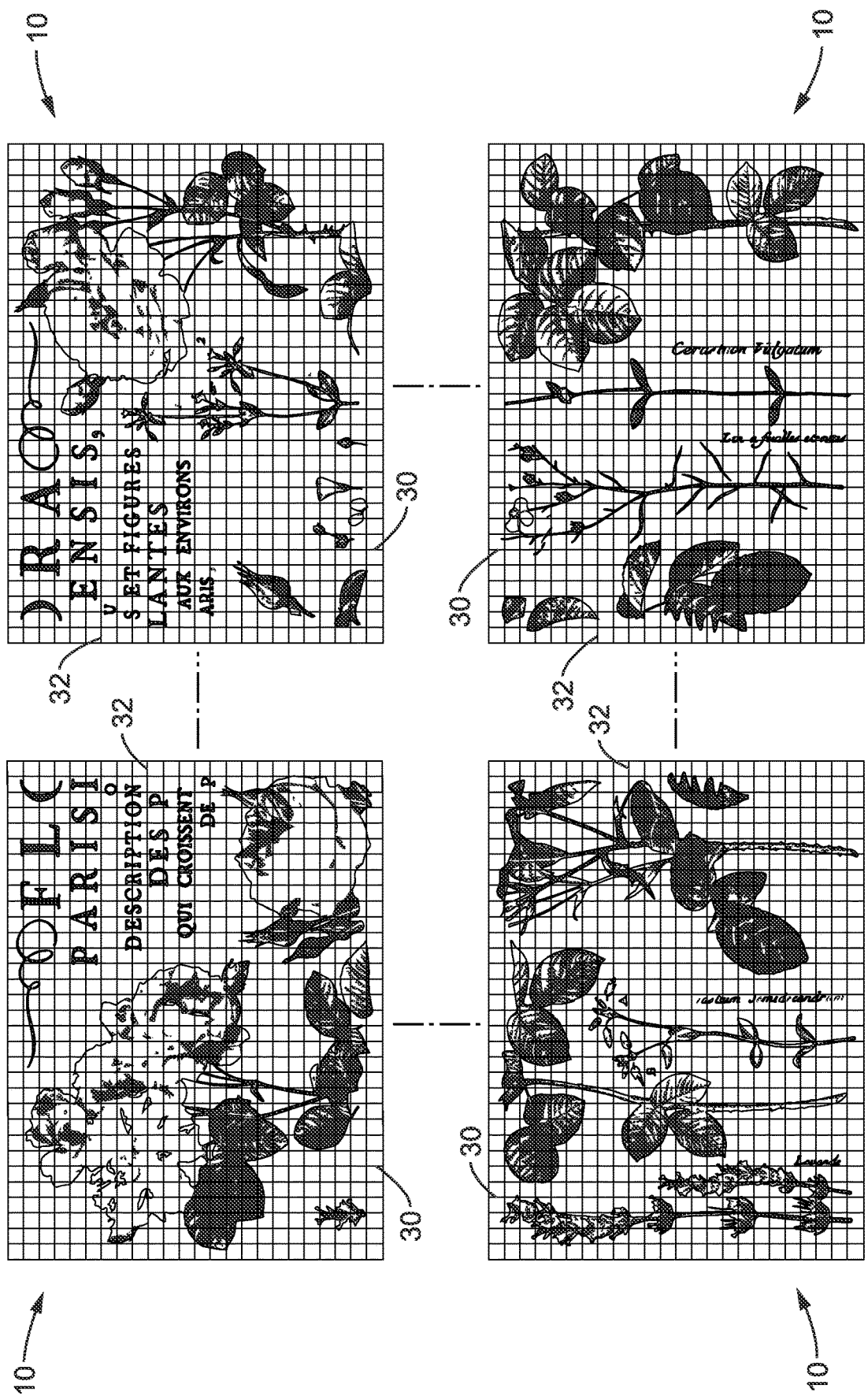
FIG. 4 illustrates multiple decorative transfer apparatus sections for forming a larger composite image according to an embodiment of the present disclosure.
Figure 5:
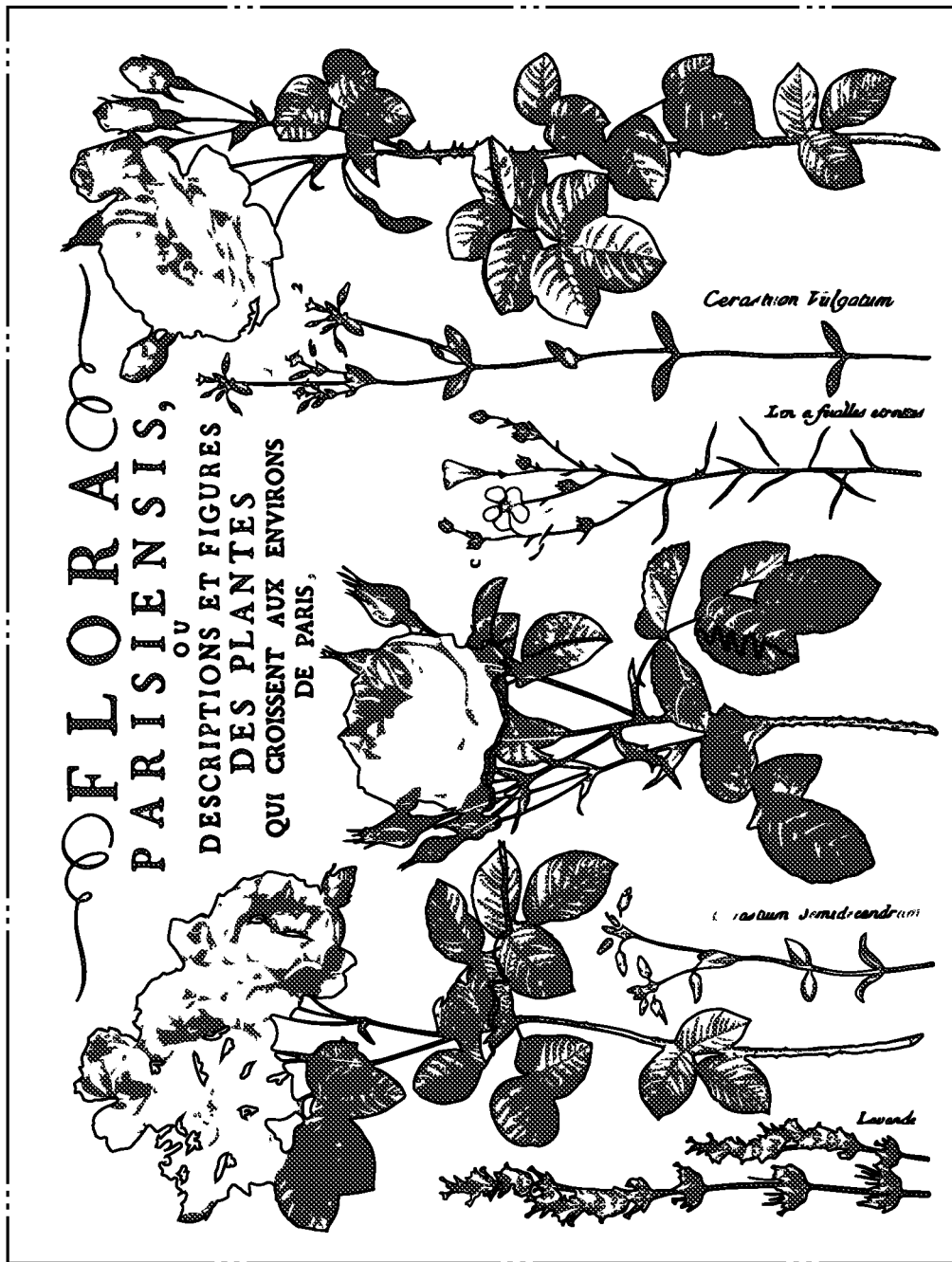
FIG. 5 illustrates a composite image formed using multiple decorative transfer apparatus sections according to an embodiment of the present disclosure.

Referring to FIG. 4 and FIG. 5, it will also be appreciated that it might be desirable to apply a decorative transfer to a surface but it would not be practical to use one transfer sheet due to size. In that case, a decorative transfer can be broken down into sections and the sections carried on separate carrier sheets. In one embodiment, the lines 30, 32 in the area of one or more of edges of the carrier sheet 12 can be used as registration marks so that the carrier sheets can be positioned to form a larger composite image 34. Separate registration markings can also be provided if desired.

From the description herein, it will be appreciated that that the present disclosure encompasses multiple implementations which include, but are not limited to, the following:

1. A decorative transfer apparatus, comprising: a carrier sheet; and a decorative transfer on one side of the carrier sheet; the decorative transfer formed from a pigment-based material applied to said side of the carrier sheet; the pigment-based material comprising a material that can be reactivated after it is cured by placing the pigment-based material in contact with an uncured transfer medium on an intended transfer surface.

2. The apparatus of any preceding or following implementation, wherein the pigment-based material comprises a mixture of pigment, whiting, water, and gum arabic.

3. The apparatus of any preceding or following implementation, wherein the carrier sheet comprises a translucent paper-like material.

4. The apparatus of any preceding or following implementation, wherein the carrier sheet is absorbent and sufficiently strong to withstand tension while wet.

5. The apparatus of any preceding or following implementation, wherein the pigment-based material is substantially a non-acrylic based material.

6. The apparatus of any preceding or following implementation: wherein the carrier sheet has a grid pattern; and wherein the decorative transfer can be seen through the carrier sheet with the grid pattern overlaying the decorative transfer when the decorative transfer is positioned to be applied to the intended transfer surface.

7. The apparatus of any preceding or following implementation, wherein the grid pattern provides registration marks in the area of at least one edge of the carrier sheet such that multiple carrier sheets can be aligned in relation to each other.

8. The apparatus of any preceding or following implementation: wherein the carrier sheet has a first side and a second side; wherein the grid pattern is on the first side of the carrier sheet; wherein the decorative transfer is on the second side of the carrier sheet; and wherein the decorative transfer can be seen through the carrier sheet with the grid pattern overlaying the decorative transfer when the carrier sheet is viewed from the first side.

9. In a carrier sheet for a decorative transfer, an improvement comprising: a carrier sheet; and a decorative transfer on one side of the carrier sheet; the decorative transfer formed from a pigment-based material applied to said side of the carrier sheet; the pigment-based material comprising a material that can be reactivated after it is cured by placing the pigment-based material in contact with an uncured transfer medium on an intended transfer surface.

10. The improvement of any preceding or following implementation, wherein the pigment-based material comprises a mixture of pigment, whiting, water, and gum arabic.

11. The improvement of any preceding or following implementation, wherein the carrier sheet comprises a translucent paper-like material.

12. The improvement of any preceding or following implementation, wherein the carrier sheet is absorbent and sufficiently strong to withstand tension while wet.

13. The improvement of any preceding or following implementation, wherein the pigment-based material is substantially a non-acrylic based material.

14. The improvement of any preceding or following implementation: wherein the carrier sheet has a grid pattern; and wherein the decorative transfer can be seen through the carrier sheet with the grid pattern overlaying the decorative transfer when the decorative transfer is positioned to be applied to the intended transfer surface.

15. The improvement of any preceding or following implementation, wherein the grid pattern provides registration marks in the area of at least one edge of the carrier sheet such that multiple carrier sheets can be aligned in relation to each other.

16. The improvement of any preceding or following implementation: wherein the carrier sheet has a first side and a second side; wherein the grid pattern is on the first side of the carrier sheet; wherein the decorative transfer is on the second side of the carrier sheet; and wherein the decorative transfer can be seen through the carrier sheet with the grid pattern overlaying the decorative transfer when the carrier sheet is viewed from the first side.

17. A method for applying a decorative design to an intended surface, the method comprising: providing a carrier sheet with a decorative transfer on one side of the carrier sheet, the decorative transfer formed from a pigment-based material applied to said side of the carrier sheet; applying a transfer medium to an intended transfer surface; before the transfer medium cures, placing the side of the carrier sheet with the decorative transfer against the intended transfer surface such that the decorative transfer contacts the transfer medium, wherein the material forming the decorative transfer is reactivated by contact with the transfer medium; allowing the reactivated decorative transfer and transfer medium to dry sufficiently that the carrier sheet can be removed without lifting the decorative transfer off of the transfer medium; and dampening the carrier sheet and removing the carrier sheet from the intended transfer surface.

18. The method of any preceding or following implementation, wherein the transfer medium comprises a substantially non-acrylic based material.

19. The method of any preceding or following implementation, further comprising smoothing and applying pressure to the carrier sheet after placing the carrier sheet against the intended transfer surface.

20. The method of any preceding or following implementation, further comprising applying a fixative to the decorative transfer and transfer medium after removing the carrier sheet.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A decorative transfer apparatus, comprising:
   a carrier sheet; and
   a decorative transfer on one side of the carrier sheet;
   the decorative transfer formed from a pigment-based material applied to said side of the carrier sheet;
   the pigment-based material comprising a material that can be reactivated after it is cured by placing the pigment-based material in contact with an uncured transfer medium on an intended transfer surface;
   wherein the carrier sheet has a grid pattern;
   wherein the decorative transfer can be seen through the carrier sheet with the grid pattern overlaying the decorative transfer when the decorative transfer is positioned to be applied to the intended transfer surface;
   wherein the carrier sheet has a first side and a second side;
   wherein the grid pattern is on the first side of the carrier sheet;
   wherein the decorative transfer is on the second side of the carrier sheet; and
   wherein the decorative transfer can be seen through the carrier sheet with the grid pattern overlaying the decorative transfer when the carrier sheet is viewed from the first side.

2. The apparatus of claim 1, wherein the pigment-based material comprises a mixture of pigment, whiting, water, and gum arabic.

3. The apparatus of claim 1, wherein the carrier sheet comprises a translucent material.

4. The apparatus of claim 1, wherein the carrier sheet is absorbent and sufficiently strong to withstand tension while wet.

5. The apparatus of claim 1, wherein the pigment-based material is a non-acrylic based material.

6. The apparatus of claim 1, wherein the grid pattern provides registration marks in the area of at least one edge of the carrier sheet such that multiple carrier sheets can be aligned in relation to each other.

7. In a carrier sheet for a decorative transfer, an improvement comprising:
   a carrier sheet; and
   a decorative transfer on one side of the carrier sheet;
   the decorative transfer formed from a pigment-based material applied to said side of the carrier sheet;
   the pigment-based material comprising a material that can be reactivated after it is cured by placing the pigment-based material in contact with an uncured transfer medium on an intended transfer surface;
   wherein the carrier sheet has a grid pattern;
   wherein the decorative transfer can be seen through the carrier sheet with the grid pattern overlaying the decorative transfer when the decorative transfer is positioned to be applied to the intended transfer surface;
   wherein the carrier sheet has a first side and a second side;
   wherein the grid pattern is on the first side of the carrier sheet;
   wherein the decorative transfer is on the second side of the carrier sheet; and
   wherein the decorative transfer can be seen through the carrier sheet with the grid pattern overlaying the decorative transfer when the carrier sheet is viewed from the first side.

8. The improvement of claim 7, wherein the pigment-based material comprises a mixture of pigment, whiting, water, and gum arabic.

9. The improvement of claim 7, wherein the carrier sheet comprises a translucent material.

10. The improvement of claim 7, wherein the carrier sheet is absorbent and sufficiently strong to withstand tension while wet.

11. The improvement of claim 7, wherein the pigment-based material is a non-acrylic based material.

12. The improvement of claim 7, wherein the grid pattern provides registration marks in the area of at least one edge of the carrier sheet such that multiple carrier sheets can be aligned in relation to each other.

* * * * *